United States Patent
Kim et al.

(10) Patent No.: US 9,628,361 B2
(45) Date of Patent: Apr. 18, 2017

(54) EDCA OPERATION TO IMPROVE VOIP PERFORMANCE IN A DENSE NETWORK

(71) Applicant: Apple Inc., Cupertino, CA (US)

(72) Inventors: Youngjae Kim, San Jose, CA (US); Joonsuk Kim, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 107 days.

(21) Appl. No.: 14/626,218

(22) Filed: Feb. 19, 2015

(65) Prior Publication Data
US 2015/0264090 A1    Sep. 17, 2015

Related U.S. Application Data

(60) Provisional application No. 61/952,291, filed on Mar. 13, 2014, provisional application No. 61/952,293, filed on Mar. 13, 2014.

(51) Int. Cl.
| | |
|---|---|
| *H04L 12/26* | (2006.01) |
| *H04L 29/06* | (2006.01) |
| *H04W 4/16* | (2009.01) |
| *H04W 24/08* | (2009.01) |
| *H04W 74/08* | (2009.01) |
| *H04W 84/12* | (2009.01) |

(52) U.S. Cl.
CPC ...... *H04L 43/0876* (2013.01); *H04L 65/1069* (2013.01); *H04W 4/16* (2013.01); *H04W 24/08* (2013.01); *H04W 74/085* (2013.01); *H04W 84/12* (2013.01)

(58) Field of Classification Search
CPC .................................................. H04L 43/0876
See application file for complete search history.

(56) References Cited

U.S. PATENT DOCUMENTS

| | | | |
|---|---|---|---|
| 2006/0187840 A1* | 8/2006 | Cuffaro | H04W 48/06 370/235 |
| 2007/0036116 A1 | 2/2007 | Eiger et al. | |
| 2007/0160003 A1* | 7/2007 | Meier | H04W 74/02 370/329 |
| 2007/0195787 A1 | 8/2007 | Alnuweiri et al. | |

(Continued)

FOREIGN PATENT DOCUMENTS

JP      2006246030 A     9/2006

OTHER PUBLICATIONS

Office Action, Japanese Application No. 2015-038106, mailed Jan. 26, 2016, 15 pages.

(Continued)

*Primary Examiner* — Jason Mattis
(74) *Attorney, Agent, or Firm* — Meyertons Hood Kivlin Kowert & Goetzel, P.C.; Jeffrey C. Hood; Joel L. Stevens

(57) ABSTRACT

This disclosure relates to wireless communication techniques for high short packet density scenarios. According to some embodiments, a wireless device may determine whether a wireless medium is experiencing crowded short packet conditions during a first period of time. The wireless device may select an operational mode from at least a first operational mode and a second operational mode based at least in part on whether the wireless medium is experiencing crowded short packet conditions. The wireless device may perform wireless communication on the wireless medium according to the selected operational mode.

20 Claims, 9 Drawing Sheets

(56) References Cited

U.S. PATENT DOCUMENTS

| | | | |
|---|---|---|---|
| 2008/0076442 A1* | 3/2008 | Ishii | H04W 28/18 455/453 |
| 2008/0225756 A1 | 9/2008 | Anamm et al. | |
| 2009/0234996 A1 | 9/2009 | Bugenhagen | |
| 2012/0314694 A1 | 12/2012 | Hsieh | |
| 2015/0063105 A1* | 3/2015 | Liu | H04W 28/0215 370/232 |

OTHER PUBLICATIONS

Kawamura et al., "EDCA Parameter Dynamic Updating Art of Wireless LAN", NTT technical journal, Aug. 2007, vol. 19, No. 8, 12 pages.

* cited by examiner

EDCA OPERATION TO IMPROVE VOIP PERFORMANCE IN A DENSE NETWORK

PRIORITY CLAIM

The present application claims benefit of priority to U.S. Provisional Application No. 61/952,291 titled "EDCA Operation to Improve VoIP Performance in a Dense Network" and filed on Mar. 13, 2014, and to U.S. Provisional Application No. 61/952,293 titled "Control Frame Format for EDCA Enhancement" and filed on Mar. 13, 2014, both of which are hereby incorporated by reference in their entirety as though fully and completely set forth herein.

FIELD

The present disclosure relates to wireless communication, including to techniques for modifying EDCA operation in dense IEEE 802.11 wireless systems.

DESCRIPTION OF THE RELATED ART

Wireless communication systems are rapidly growing in usage. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Wireless communication technologies tend to naturally lend themselves to use under mobile conditions. As such, wireless communication systems may sometimes have higher numbers of wireless devices present, and sometimes have lower numbers of wireless devices present. At least some wireless communication technologies may exhibit variable performance depending (among various other possible reasons) on the density of devices in wireless communication systems configured according to those wireless communication technologies. For example, a wireless communication technology which provides good performance with a smaller density of devices with a certain configuration might exhibit degraded performance with a larger density of devices with the same configuration.

SUMMARY

This document describes, inter alia, methods for enhanced distributed channel access (EDCA) operation for wireless devices in relatively dense IEEE 802.11 (Wi-Fi) wireless communication systems, and describes wireless devices configured to implement the described methods.

According to the techniques described herein, a wireless device may monitor a wireless communication medium to detect packets communicated on the wireless medium, including determining packet length for each detected packet. The wireless device may accordingly be able to count the number of short packets (e.g., those having a packet length below a predetermined threshold) communicated on the wireless medium over time.

If many such packets are being communicated, this may be considered a "crowded" short packet condition; the wireless medium may thus be considered to be in a crowded short packet state. If few such packets are being communicated, this may be considered an "uncrowded" short packet condition; the wireless medium may thus be considered to be in an uncrowded short packet state.

Depending on which state the wireless medium is in, the wireless device may select an appropriate operational mode from various possible operational modes. The operational modes may relate to any of various characteristics used when communicating on the wireless medium. As one possibility, for example in wireless communication system which uses contention based medium access such as Wi-Fi, the operational modes may relate to medium access algorithms. For example, one operational mode could include using enhanced distributed channel access (EDCA) as a medium access algorithm for both uplink and downlink communications, while another operational mode could include using EDCA as a medium access algorithm for downlink communications only, and instead using legacy DCA for uplink communications.

As another (additional or alternative) possibility, one or more operational features may be enabled or disabled depending on the state of the wireless medium. For example, if the wireless medium is experiencing crowded short packet conditions, there may be a greater chance of collisions occurring between short and long packets than under uncrowded short packet conditions. Accordingly, the wireless device may enable one or more operational features configured to reduce or avoid collisions between short (e.g., voice) and long (e.g., non-voice) packets in the wireless medium under crowded short packet conditions.

As one possible such operational feature, use of request-to-send (RTS) and clear-to-send (CTS) indications may be enabled for non-voice packets in a Wi-Fi network. Since RTS/CTS indications may be relatively short, the consequences of a collision between such packets and other short packets may be relatively small; for example, such a collision may result in the wireless medium being unavailable for a relatively short amount of time relative to a collision between a short packet and a long packet, in which case the wireless medium may be unavailable for the entire length of time during which the long packet is being transmitted. If the RTS/CTS is successful, the chance of a collision between the long packet and another packet may be greatly reduced.

As another possible such operational feature, a certain number of slots after each Distributed Coordination Function (DCF) Interframe Space (DIFS) may be reserved for voice packets. For example, if a wireless device has a non-voice packet to be transmitted, and the backoff counter is below the reserved number of slots after a DIFS, the backoff counter may be increased (added to) to a number which is equal to or higher than the reserved number of slots. In this way, it may be ensured that only voice packets will be transmitted for the reserved number of slots. By the time the backoff counter for a non-voice packet reaches zero, the likelihood of the packet being transmitted without a collision may be greater than without such a feature.

If desired, any or all such features (among other possible features) may be used in combination. Such a combination may further decrease the likelihood of collisions between long and short packets, and may (at least in some instances) substantially increase overall network throughput in crowded short packet conditions.

Utilizing different operational modes and/or different operational features depending on the short packet state of the wireless medium may improve overall network efficiency, at least in some instances. For example, in the case of Wi-Fi, using EDCA for both uplink and downlink communications may provide excellent overall performance in uncrowded short packet conditions, but performance may degrade as the number of short packets in the network increases, while using EDCA for downlink communications and legacy DCA for uplink communications may provide better overall performance in crowded short packet conditions, but may not match the performance achieved by using EDCA for both uplink and downlink communications in uncrowded short packet conditions.

The techniques described herein may be implemented in and/or used with a number of different types of devices, including but not limited to access point devices, cellular phones, portable media players, portable gaming devices, tablet computers, wearable computing devices, remote controls, wireless speakers, set top box devices, television systems, and computers.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
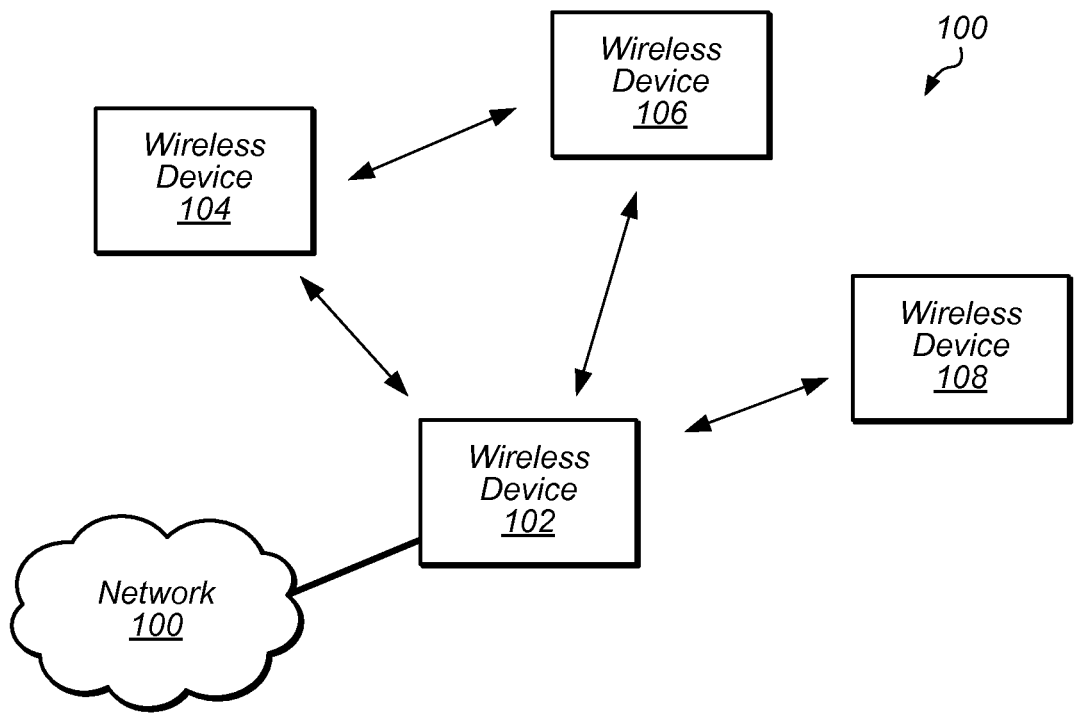
FIGS. 1-2 illustrate exemplary (and simplified) wireless communication systems, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory computer accessible memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

Station (STA)—any of various types of computer systems devices which are mobile or portable and which performs wireless communications. Examples of STAs include mobile telephones or smart phones (e.g., iPhone™, Android™-based phones), portable gaming devices (e.g., Nintendo DS™, PlayStation Portable™, Gameboy Advance™, iPhone™), laptops, wearable devices (e.g., smart watch, smart glasses), PDAs, portable Internet devices, music players, data storage devices, or other handheld devices, etc. In general, the term "STA" can be broadly defined to encompass any electronic, computing, and/or telecommunications device (or combination of devices) which is easily transported by a user and capable of wireless communication.

Base Station or Access Point (AP)—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

PHY rate or PHY data rate—A rate at which devices communicate with each other over a medium. Many wireless communication technologies (including IEEE 802.11) may provide for the use of different combinations of modulation type, coding rate, numbers of spatial streams, channel widths, and/or other physical layer characteristics. Each such combination may result in (and in some cases be referred to as) a "PHY rate". The combination of physical layer characteristics which result in a given PHY rate may also be referred to as a "modulation and coding scheme", "MCS", or "MCS index". "Lower" or "more robust" PHY rates/MCS indices may provide receivers with greater capability to successfully receive information being communicated under less-than-ideal medium conditions than "higher" or "less robust" PHY rates (e.g., by using a lower density modulation scheme and/or including a greater proportion of error correction coding information), often at a cost of potential throughput. Higher or less robust PHY rates may, in contrast, provide more efficient medium use and provide greater throughput than lower PHY rates (e.g., by using a higher density modulation scheme and/or including a lesser proportion of error correction coding information), but may be more difficult to receive under less-than-ideal medium conditions.

IEEE 802.11—refers to technology based on IEEE 802.11 wireless standards such as 802.11a, 802.11.b, 802.11g, 802.11n, 802.11-2012, 802.11ac, and/or other IEEE 802.11 standards. IEEE 802.11 technology may also be referred to as "Wi-Fi" or "wireless local area network (WLAN)" technology.

Figure 2:
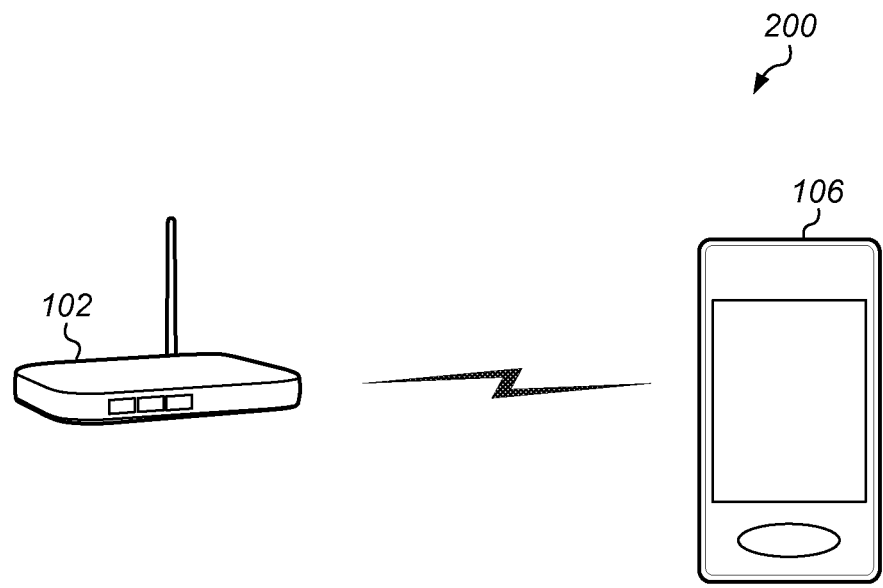

FIGS. 1-2—Communication System

FIG. 1 illustrates an exemplary (and simplified) wireless communication system 100, according to some embodiments. It is noted that the system 100 of FIG. 1 is merely one example of a possible system, and embodiments may be implemented in any of various systems, as desired. For example, note that although the exemplary wireless communication system 100 illustrated in FIG. 1 is shown as including four wireless devices, aspects of the disclosure may be implemented in wireless communication systems having greater or lesser numbers (i.e., any arbitrary number) of wireless devices.

As shown, the exemplary wireless communication system 100 includes multiple wireless devices 102-108 which communicate over a transmission medium. Some or all of the wireless devices may be substantially mobile devices ("stations" or "STAs"). Alternatively, or in addition, some or all of the wireless devices may be substantially stationary.

The wireless devices 102-108 may communicate over the wireless transmission medium in such a manner as to form a wireless network. The wireless network may be an IEEE 802.11 'infrastructure mode' network provided by a dedicated access point (e.g., wireless device 102); alternatively, the wireless network may be an 'ad-hoc' or peer-to-peer based network. Note that it may be possible that the wireless network may include one or more 'hidden nodes'; for example, as shown, wireless device 108 may be within communication range of wireless device 102, but may not be able to detect (and/or be detected by) wireless devices 104 and 106. The wireless devices 102-108 may be configured to perform IEEE 802.11 wireless communication according to aspects of the present disclosure.

One or more of the wireless devices may be equipped to communicate with one or more external networks. For example, as shown, wireless device 102 may be communicatively coupled to network 100. The external network(s) may be any of a variety of types of networks, such as a cellular service provider's core network, the Internet, or an organization's intranet, among various possibilities.

Note that one or more of the wireless devices 102-108 may be capable of communicating using multiple wireless communication standards. For example, one or more of the wireless devices 102-108 may be configured to communicate using at least one wireless networking protocol (e.g., Wi-Fi) and/or peer-to-peer wireless communication protocol (e.g., BT, Wi-Fi peer-to-peer, etc.) and at least one cellular communication protocol (e.g., GSM, UMTS (WCDMA, TD-SCDMA), LTE, LTE-Advanced (LTE-A), HSPA, 3GPP2 CDMA2000 (e.g., 1×RTT, 1×EV-DO, HRPD, eHRPD), etc.). Any or all of wireless devices 102-108 may also, or alternatively, be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

Any or all of wireless devices 102-108 may be configured to perform any of the method embodiments described herein, or any portion of any of the method embodiments described herein, for example to select an operational mode and/or operational characteristics depending on traffic conditions in the wireless communication system 100.

FIG. 2 illustrates an exemplary wireless communication system 200 in which aspects of the system 100 of FIG. 1 according to one possible implementation are represented. As shown, in the illustrated system wireless device 106 may be a mobile station (STA) 106 and wireless device 102 may be an access point 102 (also referred to as an "AP", or alternatively as a "base station" or "BS"). The STA 106 may be a user device with Wi-Fi communication capability such as a mobile phone, a hand-held device, a computer or a tablet, or virtually any type of wireless device. The AP 102 may be an access point device with Wi-Fi communication capability such as a wireless router or other wireless access point.

Either or both of the AP 102 and the STA 106 may include a processor that is configured to execute program instructions stored in memory. Either or both of the AP 102 and the STA 106 may perform any of the method embodiments described herein by executing such stored instructions. Alternatively, or in addition, a programmable hardware element such as an FPGA (field-programmable gate array) that is configured to perform any of the method embodiments described herein, or any portion of any of the method embodiments described herein, may be included as part of the AP 102 and/or the STA 106.

Figure 3:
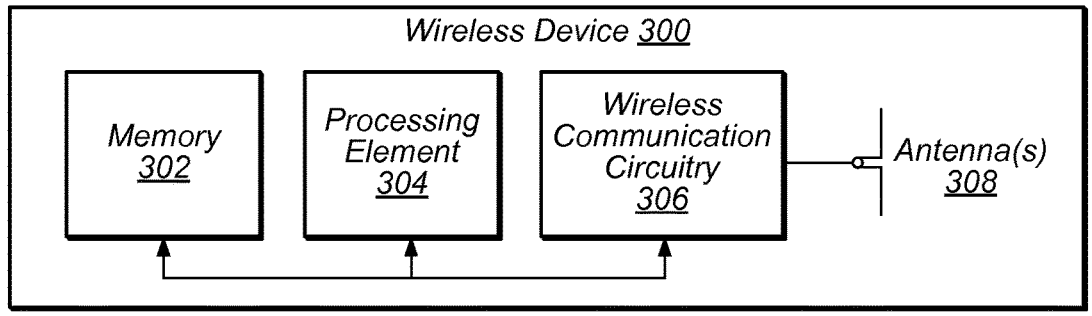
FIG. 3 illustrates a block diagram of an exemplary wireless device, according to some embodiments.

FIG. 3—Exemplary Block Diagram of a Wireless Device

FIG. 3 illustrates an exemplary block diagram of a wireless device 300 which may be configured for use in conjunction with various aspects of the present disclosure, according to some embodiments. The device 300 may be any of a variety of types of device and may be configured to perform any of a variety of types of functionality. For example, the device 300 may be a substantially portable device (a mobile device), such as a mobile phone, a personal productivity device, a computer or a tablet, a wearable device, a handheld gaming console, a portable media player, etc. Alternatively, the device 300 may be a substantially stationary device, such as a television, a subwoofer, speaker, or other audio rendering device, a wireless access point, a set-top box, etc., if desired.

As shown, the device 300 may include a processing element 304. The processing element 304 may include or be coupled to one or more local and/or system memory elements, such as memory 302. Memory 302 may include any of a variety of types of memory and may serve any of a variety of functions. For example, memory 302 could be RAM serving as a system memory for processing element 304. Other types and functions are also possible.

The device 300 may also include wireless communication circuitry 306. The wireless communication circuitry 306 may include analog and/or digital circuitry components, and may alternatively be referred to as a 'radio'. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the wireless device 300 may share one or more parts of a receive and/or transmit chain between multiple wireless communication technologies, such as those discussed above. The wireless communication circuitry may include or be coupled to one or more antennas 308.

Note that if desired, the wireless communication circuitry 306 may include a discrete processing element in addition to processing element 304; for example, processing element 304 may be an 'application processor' while wireless communication circuitry 306 may include its own 'baseband processor'; alternatively (or in addition), processing element 304 may provide processing capability for the wireless communication circuitry 306. The device 300 may be capable of communicating using any of various wireless communication technologies by way of wireless communication circuitry 306 and antenna(s) 308.

The device 300 may additionally include any of a variety of other components (not shown) for implementing device functionality, depending on the intended functionality of the device 300, which may include further processing and/or memory elements, one or more power supply elements (which may rely on battery power and/or an external power source) user interface elements (e.g., display, speaker, microphone, camera, keyboard, mouse, touchscreen, etc.), additional communication elements (e.g., antenna(s) for wireless communication, I/O ports for wired communication, communication circuitry/controllers, etc.) and/or any of various other components.

The components of the device 300, such as processing element 304, memory 302, wireless communication circuitry 306, and antenna(s) 308, may be operatively coupled via one or more intra-chip or inter-chip interconnection interfaces, which may include any of a variety of types of interface, possibly including a combination of multiple types of interface. As one example, a USB high-speed inter-chip (HSIC) interface may be provided for inter-chip communications between processing element 304 and wireless communication circuitry 306. Alternatively (or in addition), a universal asynchronous receiver transmitter (UART) interface, a serial peripheral interface (SPI), inter-integrated circuit (I2C), system management bus (SMBus), and/or any of a variety of other communication interfaces may be used for communications between processing element 304, memory 302, wireless communication circuitry 306, and/or any of various other device components. Other types of interfaces (e.g., peripheral interfaces for communication with peripheral components within or external to device 300, etc.) may also be provided as part of device 300.

As described herein, the device 300 may include hardware and software components for implementing features for operation in high density IEEE 802.11 wireless communication systems, such as those described herein with reference to, inter alia, FIGS. 4-12.

Figure 4:
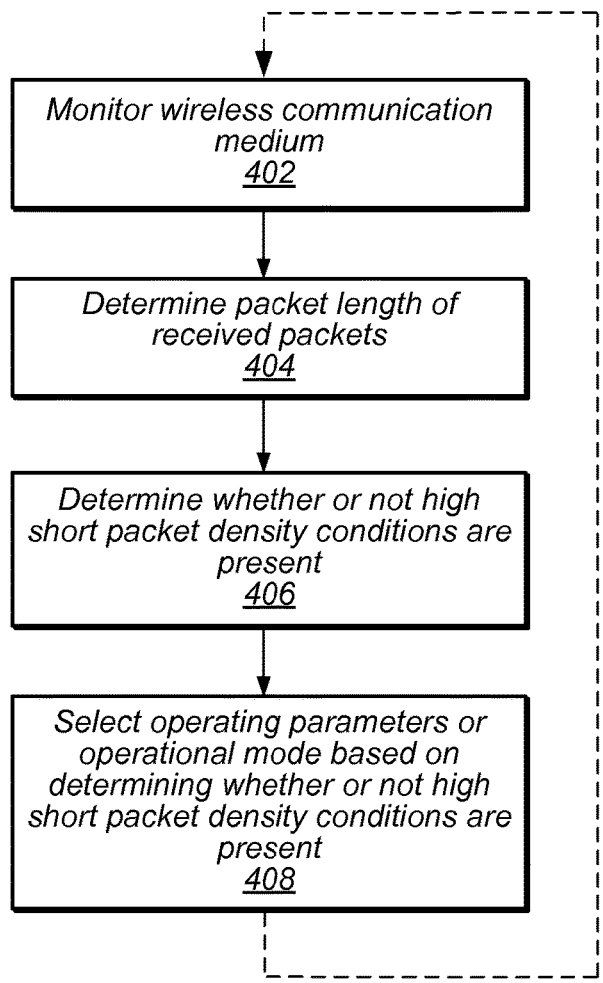
FIG. 4 is a flowchart diagram illustrating aspects of an exemplary method for determining whether crowded short packet conditions exist on a wireless communication medium, according to some embodiments.

FIG. 4—Flowchart Diagram

FIG. 4 is a flowchart diagram illustrating a method that may be used for performing wireless communication in a wireless communication system, such as an IEEE 802.11 wireless communication system, according to some embodiments. The method may be used to improve performance in the wireless communication system under high short packet density conditions, in particular by providing a way for a wireless device to determine whether high short packet density conditions are present, and modifying operating parameters and/or an operational mode accordingly.

Such a method may be useful, as one possibility, in a crowded voice over internet protocol (VoIP) traffic scenario. For example, in such a scenario, both legacy distributed channel access (legacy DCA) and enhanced distributed channel access (EDCA) medium sharing techniques may exhibit problems which may limit their performance. Accordingly, it might be useful to implement a new technique and/or modification of existing techniques under crowded VoIP traffic scenarios.

Since VoIP traffic may generally include relatively short packets, and furthermore because the medium sharing technique limitations noted above may result more generally from crowded short packet conditions rather than specifically from crowded VoIP traffic conditions, it may be possible to determine when to implement such new and/or modified existing techniques by detecting when a high density of short packet traffic is present, for example according to the method of FIG. 4.

The method shown in FIG. 4 may be used in conjunction with any of the computer systems or devices shown in the above Figures, among other devices. Some of the method elements shown may be performed concurrently, in a different order than shown, or may be omitted. Additional method elements may also be performed as desired. As shown, the method may operate as follows.

In 402, a wireless device may monitor a wireless communication medium. This may include detecting packets communicated on the wireless communication medium according to a first wireless communication technology. For example, the wireless device may monitor a Wi-Fi medium for Wi-Fi transmissions using carrier sensing capabilities.

In 404, the wireless device may determine the packet length of each detected packet, or of at least a subset of detected packets. The packet length may be detected in any of a variety of ways. As one possibility, packet length information provided as part of control or signaling information, which may be located near the beginning of each wireless transmission, may be decoded by the wireless device to determine each packet's length. For example, in a Wi-Fi communication system, packet length may be included in the physical (PHY) layer preamble of each packet (and/or possibly in other locations, such as in media access control (MAC) layer headers). In such a case, the wireless device may be able to obtain the packet length information and determine the packet length of each transmission on the wireless communication medium without needing to monitor the wireless communication medium for the entire length of each wireless transmission; for example, in a power savings (PS) mode, after determining the packet length and the intended destination for each packet detected on the wireless communication medium, the wireless device may enter a low power state for the remaining length of each packet which is not intended for the wireless device rather than actively decoding the entire packet. As another possibility, the wireless device may determine the packet length of each detected packet by monitoring the wireless communication medium for the entire length of each wireless transmission, if desired.

In 406, the wireless device may determine whether high short packet density conditions are present. This may be based (at least in part) on monitoring the wireless communication medium and determining packet length of each detected packet. For example, the wireless device may, over the course of a certain ("first") period of time (e.g., a predetermined or statically determined period of time), how many detected packets have a packet length shorter than a 'packet length threshold'. If the number of detected packets with packet length shorter than the packet length threshold during the first period of time is greater than a certain ("first") threshold, this may be considered an indication that crowded or dense short packet conditions are present.

Note that the packet length threshold and the first threshold number may be configured as desired. In some instances, 'short' packets may be packets such as voice packets (e.g., VoIP packets) and other packets with similar or lesser length, such as packets with lengths of less than 100 bytes, less than 150 bytes, less than 200 bytes, or packets under any other desired packet length threshold value. The threshold number of packets with packet length less than the packet length threshold may similarly be configured as desired, and may generally also depend on the period of time over which the determination is made. For example, as one possibility, a scenario in which more than 20 (or 15, or 25, or any other desired number) devices are present and primarily transmitting and/or receiving short packet traffic (for example, participating in a VoIP call) in the wireless communication system might be considered to be a high short packet density scenario. Thus in this example, the first threshold number may be configured to correspond (at least approximately) to such a scenario, for example based on typical VoIP transmission frequency characteristics and the length of the period of time over which the determination will be made. As will be recognized by those skilled in the art, numerous other means of determining appropriate threshold values for delineating between crowded or high-density short packet scenarios and uncrowded or low-density short packet scenarios are also possible.

It should also be noted that, at least in some instances, some packets (e.g., certain types of packets/transmissions) may be excluded from consideration when determining whether crowded short packet conditions are present. For example, in some implementations, some or all non-content-bearing packets might be excluded from consideration, such as in order to obtain an indication of the density conditions of short content-bearing (or other selected) packets rather than all short packets. As one possibility, request-to-send (RTS), clear-to-send (CTS), and acknowledgement (ACK) packets might be excluded from being counted in a Wi-Fi communication system.

In 408, the wireless device may select or modify operating parameters and/or an operational mode based on determining whether high short packet density conditions are present. For example, if crowded short packet conditions are determined to be present, a 'crowded short packet situation' flag may be set, which may trigger certain configuration modifications. If crowded short packet conditions are not determined to be present, the 'crowded short packet situation' flag may be cleared, which may allow the device to continue operating under the present configuration or may cause the device to implement a configuration corresponding to uncrowded conditions.

If desired, a hysteresis may be introduced in order to avoid an excessive number of transitions between crowded and uncrowded short packet situations. For example, the previously described 'first threshold number' may be used when determining whether or not high short packet density conditions exist if it was most recently determined that crowded short packet conditions are not present, but a different comparison and threshold may be used if it was most recently determined that crowded short packet conditions are present. Such a comparison might include determining if the number of detected packets having a packet length less than the packet length threshold is less than a "second" threshold number, where the second threshold number is less that the first threshold number. If so, it may be considered the case that crowded short packet conditions are no longer present, and the 'crowded short packet situation' flag may be cleared.

Note that, as indicated by the dashed return path from step 408 to step 402, the method of FIG. 4 may be repeated as desired (possibly continuously) for continual operation of the wireless device. For example, the wireless device might monitor the wireless communication medium for a first period of time to determine whether crowded short packet conditions are present, and based on that determination select an operational mode for a second period of time. During the second period of time, the wireless device might again monitor the wireless communication medium to determine whether crowded short packet conditions are present. That determination might be used to select an operational mode for a third period of time. Such continual re-evaluation and selection of operational mode and/or parameters may allow the wireless device to adapt to changes in current conditions as (or shortly after) they occur.

As previously noted, the appropriate operational mode for crowded and uncrowded short packet scenarios may be determined as desired. As one exemplary possibility in a Wi-Fi communication system, a "first" operational mode (e.g., for uncrowded short packet scenarios) may include enabling enhanced distributed channel access (EDCA) for both uplink and downlink VoIP communications, while a "second" operational mode (e.g., for crowded short packet scenarios) may include enabling EDCA for downlink VoIP communications and disabling EDCA (e.g., using legacy DCA) for uplink VoIP communications. For example, while EDCA may provide good communication characteristics for VoIP communications under low short packet density conditions, at high short packet density conditions, the number of uplink collisions which occur may increase, causing a relatively high packet error rate, which may degrade call quality. Legacy DCA, meanwhile, may exhibit relatively high latency and packet loss ratio for downlink communications at high short packet densities, but may provide acceptable latency and packet loss ratio characteristics for uplink communications even under relatively high short packet density conditions. Thus, the combination of downlink EDCA and uplink legacy DCA for VoIP communications might be selected as a possible second operational mode in such an exemplary Wi-Fi communication system, as one possibility.

Figure 5:
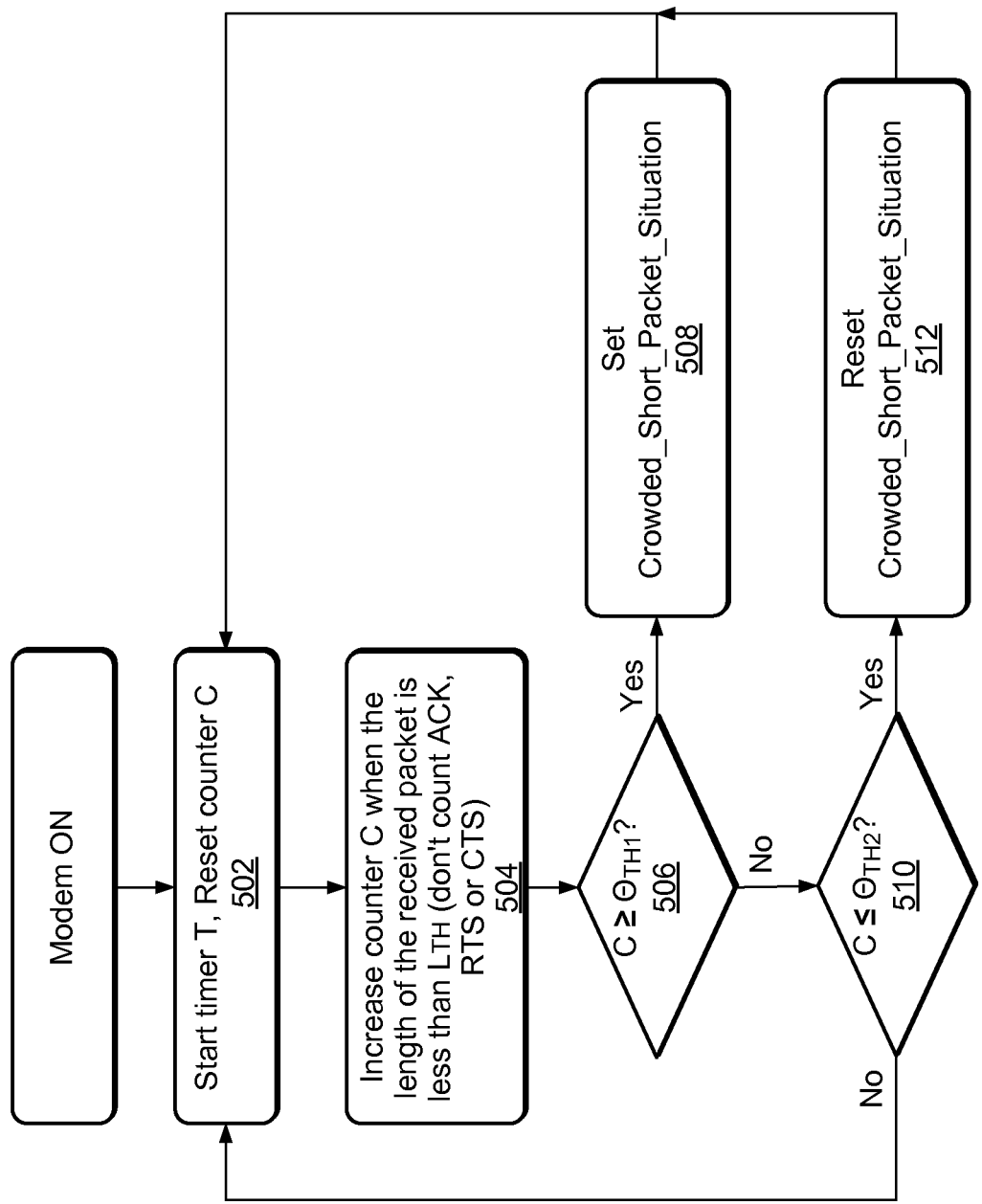
FIG. 5 is a state diagram illustrating aspects of an exemplary method for determining whether crowded short packet conditions exist on a wireless communication medium, according to some embodiments.
Figure 6:
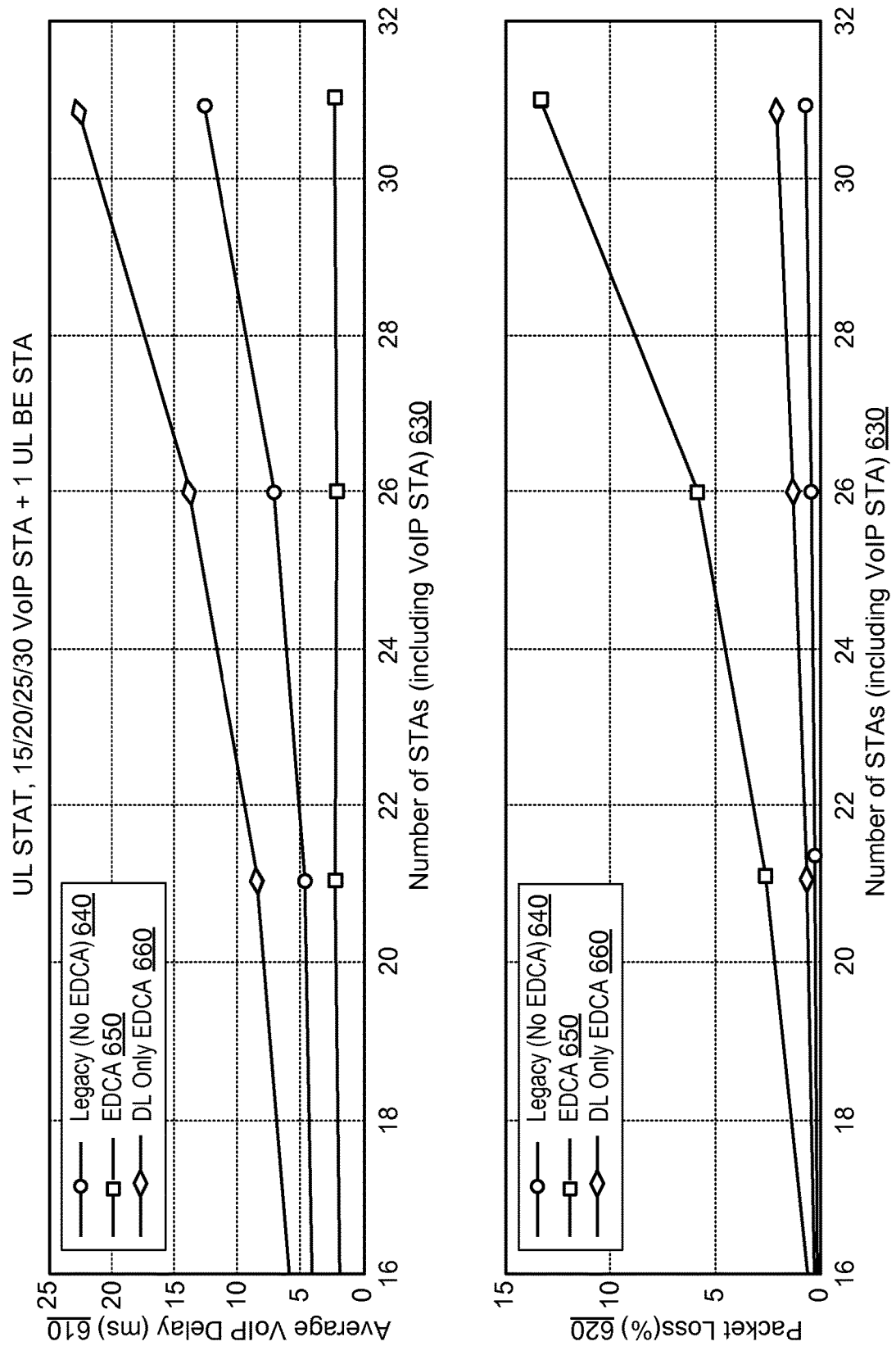
FIGS. 6-7 are graphs illustrating exemplary simulation results for various wireless communication systems at various system densities, according to some embodiments.
Figure 7:
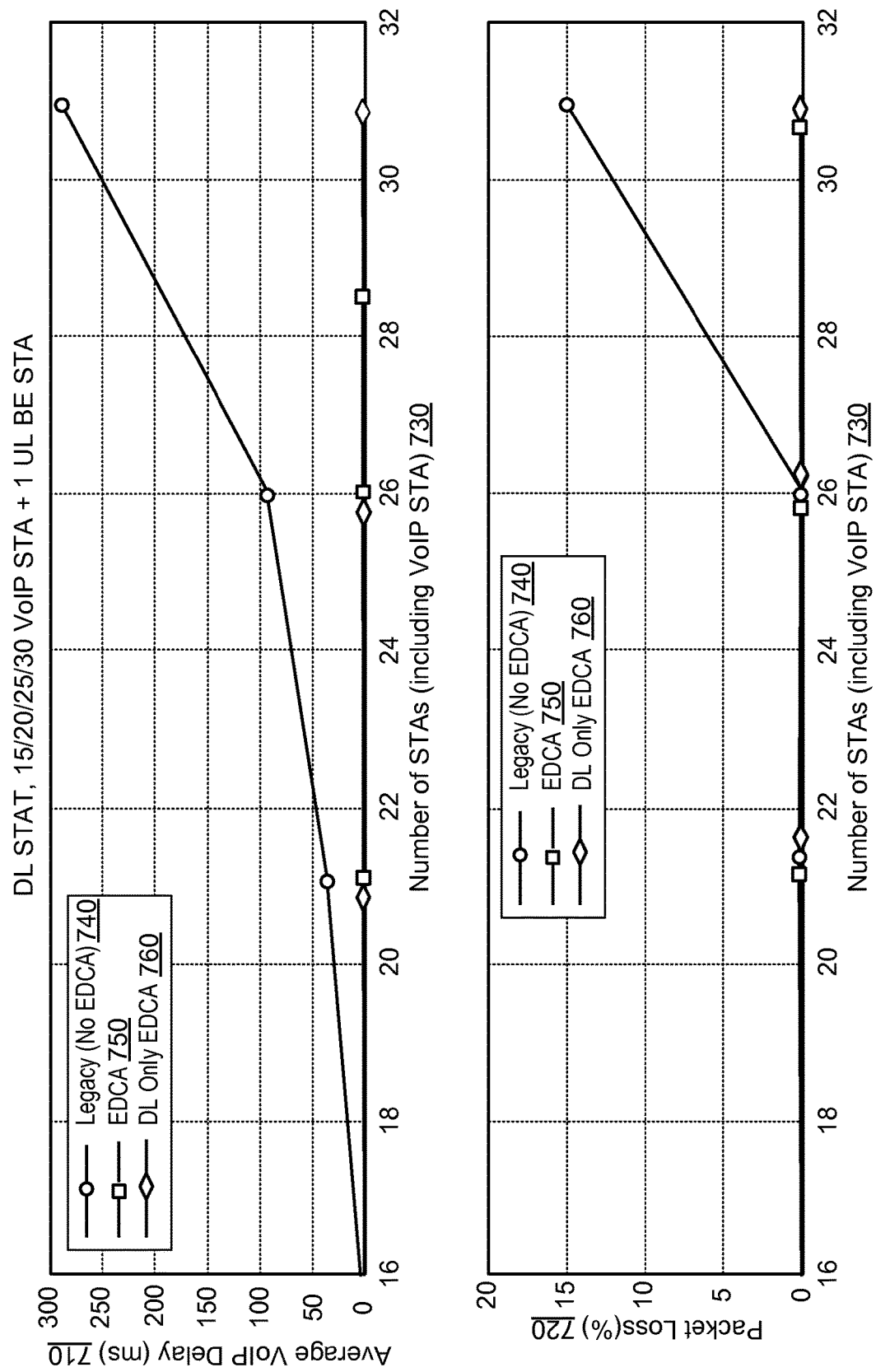

It should be noted that detection of crowded short packet conditions, such as illustrated in and described according to the method of FIG. 4, may be performed at either or both of the access point device (AP) and one or more mobile stations (STAs) in a Wi-Fi communication system, as desired. For example, as one possibility, the AP and the STAs may each perform the method of FIG. 4 autonomously, including performing both determination of whether crowded short packet conditions are present and modifying operational parameters/modes. As another possibility, the AP may perform the determination of whether crowded short packet conditions are present, and inform (e.g., broadcast in beacons) STAs which operational parameters/modes to use accordingly. In such a scenario, rather than determining whether crowded short packet conditions are present, a STA might receive from the AP an indication of whether crowded short packet conditions are present and modify its operational parameters accordingly, or may receive an indication from the AP directly to modify the operational parameters. FIG. 5-7—State Diagram and Exemplary Simulation Results FIGS. 5-7 and the information provided herein below in conjunction therewith are provided by way of example of various considerations and details relating to a possible IEEE 802.11 wireless communication system in which the method of FIG. 4 may be implemented, and are not intended to be limiting to the disclosure as a whole. Numerous variations and alternatives to the details provided herein below are possible and should be considered within the scope of the disclosure.

FIG. 5 is an exemplary state diagram illustrating one possible technique for detecting crowded short packet conditions. As shown, for a wireless device with its modem on, in 502 a timer 'T' may be started, and a counter 'C' may be reset. In 504, during the period of time until the timer T expires, the counter C may be increased whenever the length of a received (detected) packet is less than a packet length threshold '$L_{TH}$'. In some implementations, any or all of ACKs, RTSs, and CTSs (or other such messages) may be excluded from such counting. If, by expiration (or sooner) of the timer T, the counter C is greater than a first threshold number '$\Theta_{TH1}$' (decision 506), in 508 the condition or flag 'Crowded_Short_Packet_Situation' may be set. If at expiration of the timer T, the counter C is not only not greater than $\Theta_{TH1}$ but also less than a second threshold number '$\Theta_{TH2}$' (decision 510), in 512 the condition or flag 'Crowded_Short_Packet_Situation' may be reset (cleared). If at expiration of the timer T, the counter C is not greater than $\Theta_{TH1}$ but is greater than $\Theta_{TH2}$, the current condition may not change. The wireless device may then transition back to block 502 'Start timer T, Reset counter C' and proceed again through the state diagram in a repeating manner to keep the condition or flag 'Crowded_Short_Packet_Situation' updated according to the current scenario being experienced by the wireless device. The frequency of repetition may be selected as desired and may be varied, e.g., dynamically.

FIGS. 6-7 are graphs illustrating exemplary simulation results for uplink and downlink statistics of various Wi-Fi communication systems depending on the number of stations in the systems.

FIG. 6 illustrates uplink statistics (average VoIP delay in ms 610 and packet loss percentage 620) for systems using legacy DCA for both uplink and downlink ('Legacy' 640), EDCA for both uplink and downlink ('EDCA' 650), and EDCA for downlink and legacy DCA for uplink ('DL only EDCA' 660), respectively, with respect to the number of STAs 630 in the wireless communication system, where one STA in the system is performing best effort ('AC_BE') communication and the remainder of the STAs in the system are performing VoIP communication. As shown, while EDCA 650 provides the lowest average VoIP delay, packet loss ratio increases significantly as a higher number of VoIP stations are present. Legacy 640 and DL only EDCA 660 both exhibit higher but still reasonable average VoIP delays as the number of VoIP stations increases, without significant increases in packet loss ratios.

FIG. 7 illustrates comparable downlink statistics (similarly including average VoIP delay in ms 710 and packet loss percentage 720 vs. number of STAs 730) for similar systems. As shown, both EDCA 750 and DL only EDCA 760 exhibit very low average VoIP delay and packet loss ratios, while Legacy 740 begins to exhibit rapidly increasing average VoIP delay and packet loss percentage as the number of VoIP stations increases.

Thus, a DL only EDCA medium sharing technique may improve overall performance at relatively high VoIP traffic densities. This may be at least in part because an asymmetric traffic pattern may occur with a high density of VoIP traffic, in which the AP has much more traffic to communicate than any of the STAs in the system; as a result of this, a DL only EDCA medium sharing technique may provide the AP with more access to the medium than the STAs, which may balance medium access with access need in a manner more appropriate to high VoIP traffic density scenarios.

Figure 8:
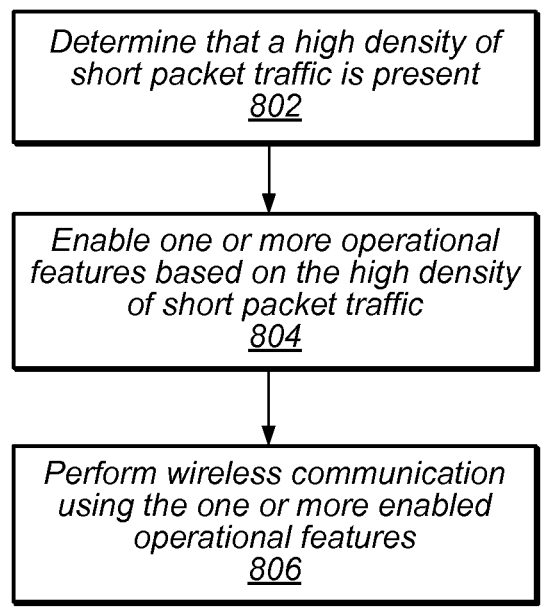
FIG. 8 is a flowchart diagram illustrating aspects of an exemplary method for enabling operational features specific to crowded short packet conditions, according to some embodiments.

FIG. 8—Flowchart Diagram

FIG. 8 is a flowchart diagram illustrating an example method that may be used for performing wireless communication in a wireless communication system, such as an IEEE 802.11 wireless communication system. The method may be used in a crowded VoIP traffic scenario (such as might cause crowded short packet conditions, similar to those described with respect to FIG. 4) in which non-voice traffic is also present. Such a scenario may increase the potential for collisions between non-voice packets and voice packets. Since non-voice packets (such as FTP packets) may be relatively long, such a collision might result in the wireless communication medium being unavailable for a relatively long time, without resulting in successful transmission of either the voice packet or the non-voice packet. The method of FIG. 8 accordingly can be used in such a scenario in order to improve performance in the wireless communication system under such high short packet density conditions, for example by reducing the probability of collisions occurring between non-voice packets and voice packets.

The method shown in FIG. 8 may be used in conjunction with any of the computer systems or devices shown in the above Figures, among other devices, and may be used independently of or in conjunction with some or all aspects of the method of FIGS. 4 (and possibly 5-7), as desired. Some of the method elements shown may be performed concurrently, in a different order than shown, or may be omitted. Additional method elements may also be performed as desired. As shown, the method may operate as follows.

In 802, a wireless device may determine that a high density of short packet traffic is present. Such a determination may be made autonomously by the wireless device (e.g., by monitoring the wireless medium, determining packet length of each packet being transmitted, and counting the number of packets with relatively short packet length, such as described in conjunction with the method of FIG. 4), or based on an indication received from another device. For example, an access point (AP) in a Wi-Fi communication system might autonomously determine that a high density of short packet traffic is present, and provide an indication of this to mobile stations (STAs) in the Wi-Fi communication system, which might in turn rely on this indication rather than themselves autonomously making such a determination. Alternatively, both the AP and STAs in the Wi-Fi communication system may be configured to autonomously determine whether a high density of short packet traffic is present, if desired.

In 804, one or more operational features may be enabled based on the high density of short packet traffic. Enabling the one or more operational features may include enabling the features at the wireless device implementing the method, and/or may include providing an indication to enable the features to one or more other wireless devices. For example, in the above-described exemplary scenario in which the STAs in a Wi-Fi communication system rely on the AP to determine whether a high density of short packet traffic is present, the AP may provide an indication (in addition to or instead of a more general indication that a high density of short packet traffic is present) specifically of the one or more operational features to enable. For example, the AP might provide such information in beacon transmissions, in which certain parameter values and/or control information may be provided.

The operational features may be any of various operational features, as desired. As one possibility, use of request-to-send (RTS) and clear-to-send (CTS) indications may be enabled for non-voice traffic. Since non-voice traffic may typically be relatively long, while RTS/CTS packets may be relatively short, a collision between an RTS packet and a VoIP packet may not cause the wireless medium to become unavailable for as long as a collision between the non-voice packet itself and the VoIP packet, and if successful, may significantly reduce (e.g., nearly eliminate) the possibility that a collision will occur involving the non-voice packet.

As another possible operational feature, a certain number of slots after each Distributed Coordination Function (DCF) Interframe Space (DIFS) may be reserved for voice traffic. This feature may also reduce the likelihood of a collision occurring between a non-voice packet and a voice packet, since it may reduce the overlap between slots in which non-voice packets and voice packets may be transmitted.

Note that the above-described operational features, among various other possible operational features, may be implemented individually or in any combination based on a determination that a high density of short packet traffic is present.

In 806, wireless communication may be performed using the one or more enabled operational features. For example, if use of RTS and CTS packets is enabled for non-voice packets, a STA with a non-voice packet next in its transmit buffer may transmit an RTS packet and wait for a CTS response packet before transmitting the non-voice packet. Similarly, if reservation of a certain number of slots after each DIFS for voice traffic is enabled, a STA with a non-voice packet next in its transmit buffer may add to its backoff counter as needed to ensure that the non-voice packet is not transmitted until at least the specified number of slots has passed. The number of slots reserved for voice traffic may be dynamically indicated (e.g., in control information in beacon transmissions) or statically determined (e.g., fixed in specification documents) as desired.

Note that eventually it may be determined that a high density of short packet traffic is no longer present. This may also be determined autonomously or based on an indication from another device, as desired. In case of such a determination, any or all of the operational features that were previously enabled may be disabled. Subsequent wireless communication may then be performed with a configuration corresponding to the presently detected network conditions.

FIGS. 9-12—State Diagrams, Exemplary Simulation Results, and Exemplary Control Information Format FIGS. 9-12 and the information provided herein below in conjunction therewith are provided by way of example of various considerations and details relating to a possible IEEE 802.11 wireless communication system in which the method of FIG. 8 may be implemented, and are not intended to be limiting to the disclosure as a whole. Numerous variations and alternatives to the details provided herein below are possible and should be considered within the scope of the disclosure.

Figure 9:
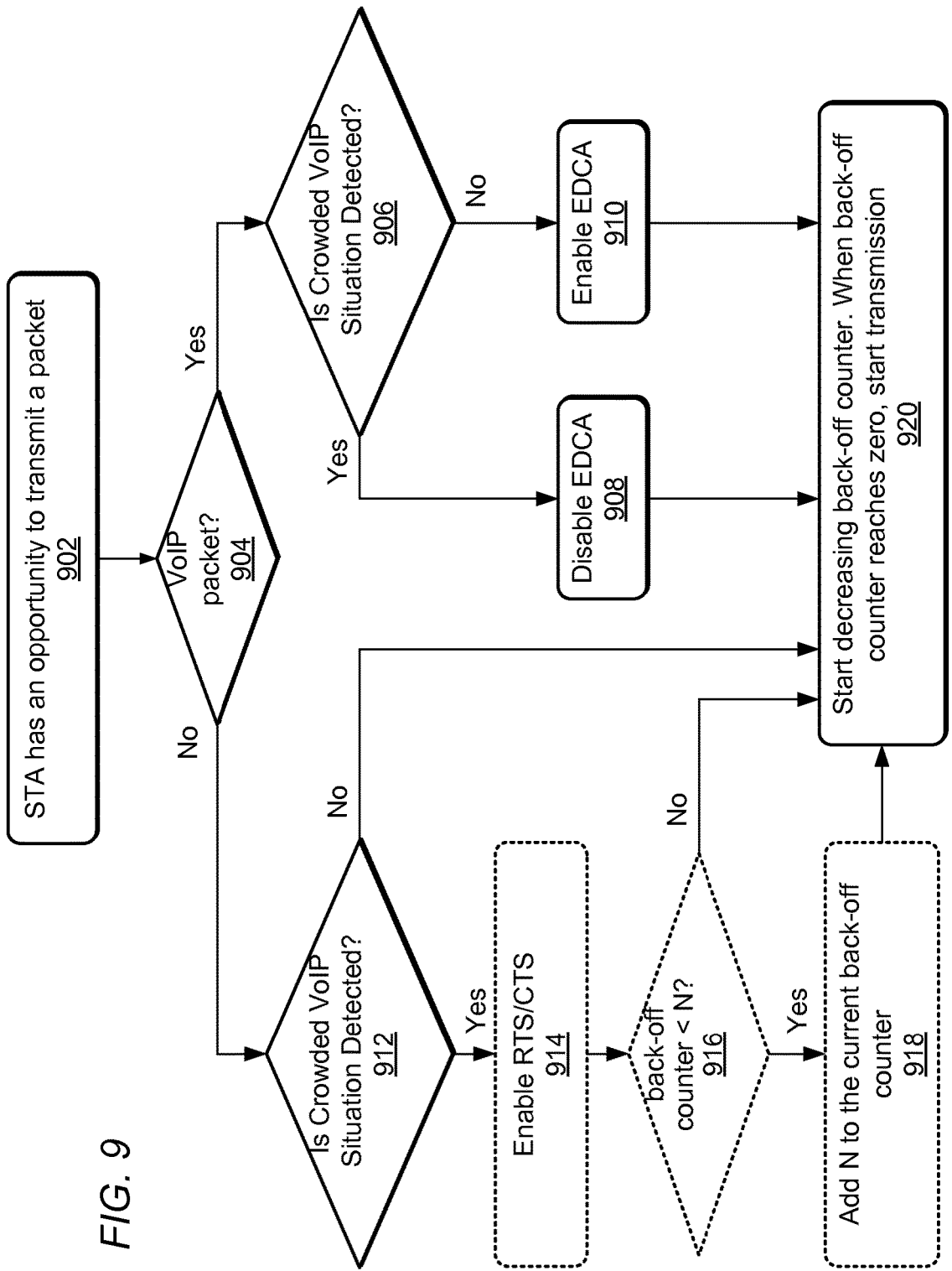
FIGS. 9-10 are state diagrams illustrating aspects of exemplary techniques for enabling operational features specific to crowded short packet conditions by a STA and an AP respectively, according to some embodiments.

FIG. 9 is an exemplary state diagram illustrating one possible transmission technique for a STA which accounts for possible crowded short packet conditions.

As shown, initially in step 902 a STA may have an opportunity to transmit a packet. In 904, the STA may determine whether the packet is a VoIP packet (or possibly more generally a voice packet). In either case (in step 906 or

912, depending on the result of decision 904), the STA may also determine whether a crowded VoIP situation is detected (e.g., autonomously or based on an indication from an AP or other wireless device), possibly according to the method of FIG. 4 and/or FIG. 5.

For a VoIP packet in a crowded VoIP situation, in a transition from decision 906 to step 908, EDCA may be disabled, while for a VoIP packet in an uncrowded VoIP situation, in a transition from decision 906 to step 910, EDCA may be enabled (or maintained). The STA may then transition to step 920 and start decreasing its backoff counter, and start the transmission when the backoff counter reaches zero.

For a non-VoIP packet in an uncrowded VoIP situation, in a transition from decision 912 directly to step 920, the wireless device may simply decrease its backoff counter until zero is reached, then start the transmission, without any special features enabled. For a non-VoIP packet in an crowded VoIP situation, in a transition from decision 912 to one or more of steps 914 and 916, RTS/CTS may be enabled (step 914), and/or a specified number ('N') of slots may be added to the backoff counter (step 918) if its value is less than N (i.e., a 'yes' decision at step 916), after which the wireless device may transition to step 920, begin decreasing its backoff counter, and start the transmission when the backoff counter reaches zero.

Figure 10:
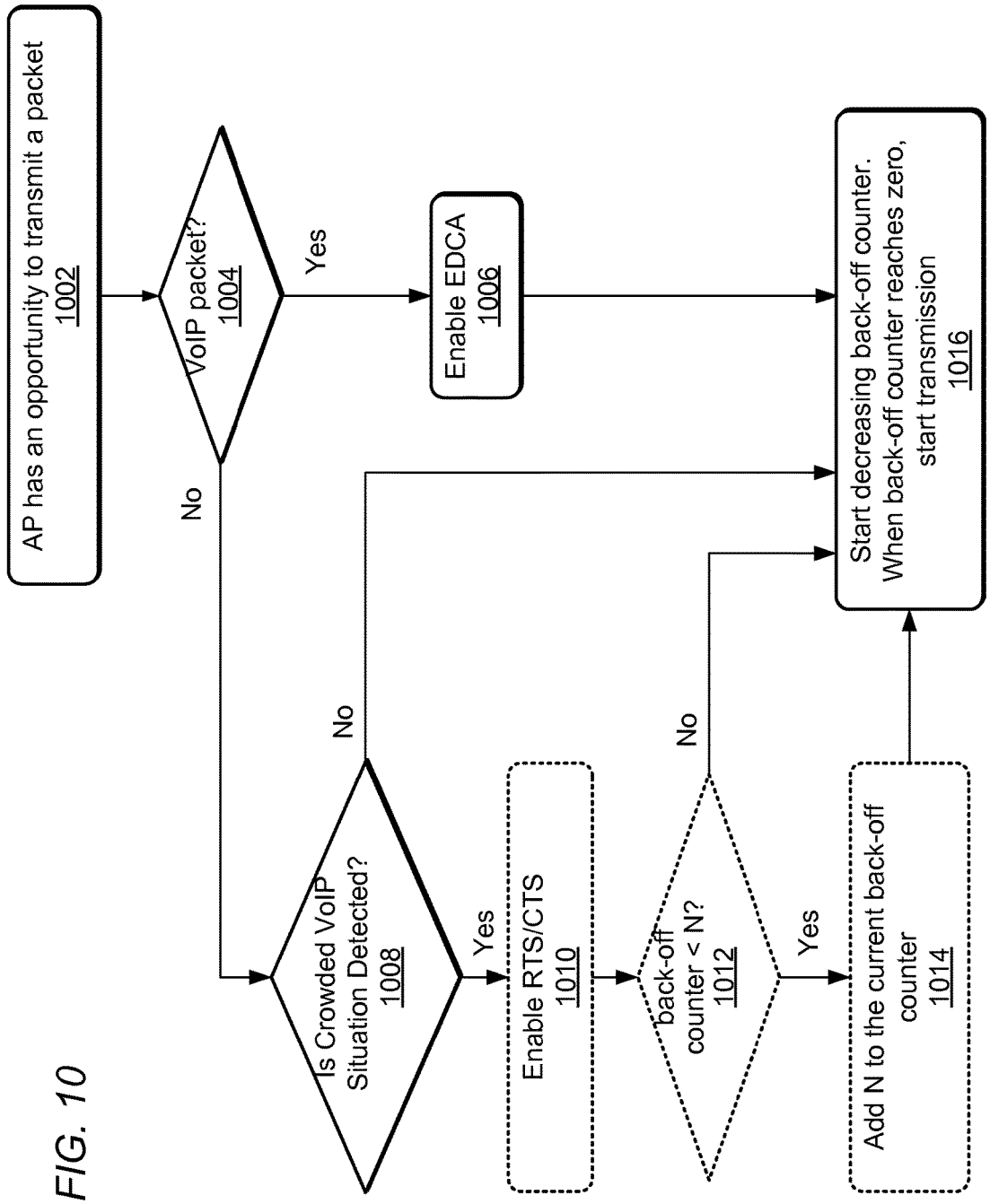

FIG. 10 is an exemplary state diagram illustrating one possible transmission technique for an AP which accounts for possible crowded short packet conditions.

As shown, initially in step 1002 an AP may have an opportunity to transmit a packet. In 1004, the AP may determine whether the packet is a VoIP packet (or possibly more generally a voice packet).

For a VoIP packet, in a transition from step 1004 to step 1006, EDCA may be enabled (e.g., whether or not a crowded short packet condition exists). The AP may transition to step 1016 and then start decreasing its backoff counter, and start the transmission when the backoff counter reaches zero.

For a non-VoIP packet, the AP may transition from decision 1004 to decision 1008 to determine whether a crowded VoIP situation is detected. In an uncrowded VoIP situation, the wireless device may transition directly from decision 1008 to step 1016 and simply decrease its backoff counter until zero is reached, then start the transmission, without any special features enabled. For a non-VoIP packet in a crowded VoIP situation, in a transition from decision 1008 to one or more of steps 1010 and 1012, RTS/CTS may be enabled (step 1010) and/or a specified number ('N') of slots may be added to the backoff counter (step 1014) if its value is less than N (i.e., a 'yes' decision at step 1012), after which the wireless device may transition to step 1016, begin decreasing its backoff counter, and start the transmission when the backoff counter reaches zero.

Figure 11:
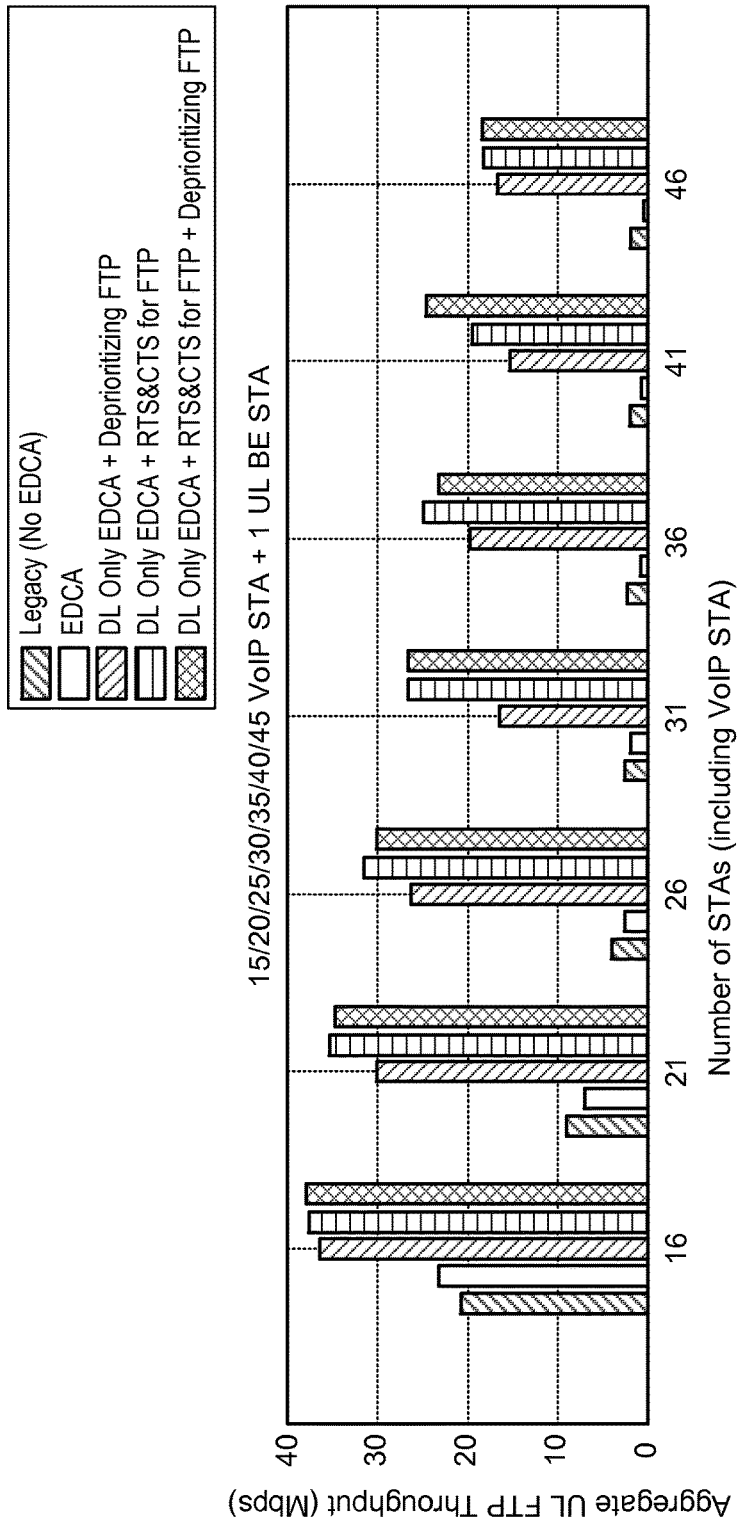
FIG. 11 is a graph illustrating exemplary simulation results for various wireless communication systems at various system densities, according to some embodiments.

FIG. 11 is a graph illustrating exemplary simulation results for average uplink FTP throughput (in Mbps) for Wi-Fi communication systems in which various operational features are used depending on the number of stations in the systems.

FIG. 11 illustrates average uplink FTP throughput for systems using legacy DCA for both uplink and downlink ('Legacy'), EDCA for both uplink and downlink ('EDCA'), EDCA for downlink and legacy DCA for uplink ('DL only EDCA') in combination with reserving a specified number of slots after each DIFS for voice packets ('deprioritizing FTP'), DL only EDCA in combination with using RTS and CTS for FTP packets ('RTS&CTS for FTP'), and DL only EDCA in combination with deprioritizing FTP and RTS&CTS for FTP, respectively. As shown, deprioritizing FTP and using RTS&CTS for FTP, either individually or in combination, may provide greatly (e.g., greater than 1000%) increased throughput for FTP at higher densities of VoIP traffic.

Figure 12:
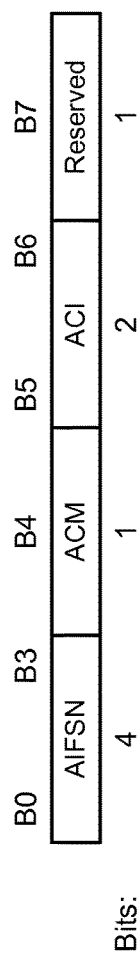
FIG. 12 illustrates an exemplary control field format, according to some embodiments.

FIG. 12 illustrates an exemplary control field which may be used to indicate (enable) the use of certain operational features, such as reserving a specified number of slots after each DIFS for voice packets and/or using RTS and CTS for non-voice packets, if desired. In particular, the illustrated control field may be the ACI/AIFSN field included in each beacon transmitted by an AP for each access category (e.g., AC_BK, AC_BE, AC_VI, and AC_VO) used in Wi-Fi. As shown, the illustrated field includes one reserved bit (B7). This bit may be used by the AP to indicate to STAs which operational features to enable during crowded VoIP traffic (or more generally high short packet traffic density) conditions. For example, for some or all of the non-voice access categories (AC_BK, AC_BE, AC_VI), setting the B7 bit equal to '1' may indicate that RTS/CTS are enabled for those access categories. Similarly, for the voice access category, setting the B7 bit equal to '1' may indicate that the first N slots after each DIFS are reserved for voice traffic.

In the following further exemplary embodiments of the disclosure are presented.

1. A method for implementation by a wireless device, comprising: performing wireless communication according to a first operational mode during a first period of time; monitoring a wireless communication medium, wherein said monitoring comprises detecting packets communicated on the wireless communication medium according to a first wireless communication technology; determining packet length for each detected packet; determining if a number of detected packets having a packet length less than a first packet length threshold during the first period of time is greater than a first threshold number; performing wireless communication according to a second operational mode during a second period of time if the number of detected packets having a packet length less than the first packet length threshold during the first period of time is greater than the first threshold number, wherein the second period of time is subsequent to the first period of time; and continuing to perform wireless communication according to the first operational mode during the second period of time if the number of detected packets having a packet length less than the first packet length threshold during the first period of time is less than the first threshold number.

2. The method of example 1, further comprising, if the number of detected packets having a packet length less than the first packet length threshold during the first period of time is greater than the first threshold number: determining if a number of detected packets having a packet length less than the first packet length threshold during the second period of time is less than a second threshold number; performing wireless communication according to the first operational mode during a third period of time if the number of detected packets having a packet length less than the first packet length threshold during the second period of time is less than the second threshold number, wherein the third period of time is subsequent to the second period of time; and continuing to perform wireless communication according to the second operational mode during the third period of time if the number of detected packets having a packet length less than the first packet length threshold during the second period of time is greater than the second threshold number.

3. The method of example 2, wherein the second threshold number is lower than the first threshold number.

4. The method of any of examples 1-3, wherein the first wireless communication technology is Wi-Fi, wherein acknowledgement, request-to-send, and clear-to-send packets are excluded when determining if the number of detected packets having a packet length less than a first packet length threshold during the first period of time is greater than a first threshold number.

5. The method of any of examples 1-4, wherein the first operational mode comprises enabling enhanced distributed channel access (EDCA) for both uplink and downlink voice over internet protocol (VoIP) communications, wherein the second operational mode comprises enabling EDCA for downlink VoIP communications and disabling EDCA for uplink VoIP communications.

6. A method for implementation by a wireless device, comprising: determining that a high density of short packet traffic is present in a Wi-Fi network; enabling one or more operational features based on said determining, wherein the one or more operational features comprise one or more of: use of request-to-send (RTS) and clear-to-send (CTS) indications for non-voice traffic; or reserving a first number of slots after each Distributed Coordination Function (DCF) Interframe Space (DIFS) for voice traffic; performing wireless communication as part of the Wi-Fi network using the one or more enabled operational features.

7. The method of example 6, further comprising, at a later time: determining that a high density of short packet traffic is no longer present in the Wi-Fi network; disabling the one or more operational features based on said determining; and performing wireless communication as part of the Wi-Fi network with the one or more operational features disabled.

8. The method of any of examples 6-7, wherein the wireless device is an access point device (AP), wherein enabling the one or more operational features comprises transmitting an indication to one or more mobile stations (STAs) in the Wi-Fi network to enable the one or more operational features.

9. A method for implementation by a wireless device, comprising: detecting packet length of packets communicated on a wireless medium over a first period of time; determining whether the wireless medium is in a crowded short packet state or an uncrowded short packet state based at least in part on a number of packets communicated on the wireless medium over the first period of time having packet length below a packet length threshold; selecting an operational mode from at least a first operational mode and a second operational mode based at least in part on determining whether the wireless medium is in the crowded short packet state or the uncrowded short packet state; and performing Wi-Fi communication on the wireless medium according to the selected operational mode.

10. The method of example 9, further comprising: determining that the wireless medium is in the crowded short packet state if the number of packets communicated on the wireless medium over the first period of time having packet length below the packet length threshold is greater than a first threshold number of packets; determining that the wireless medium is in the uncrowded short packet state if the number of packets communicated on the wireless medium over the first period of time having packet length below the packet length threshold is less than the first threshold number of packets.

11. The method of any of examples 9-10, further comprising: determining that the wireless medium is in the crowded short packet state if the number of packets communicated on the wireless medium over the first period of time having packet length below the packet length threshold is greater than a first threshold number of packets; determining that the wireless medium is in the uncrowded short packet state if the number of packets communicated on the wireless medium over the first period of time having packet length below the packet length threshold is less than a second threshold number of packets, wherein the second threshold number of packets is less than the first threshold number of packets; and determining whether the wireless medium is in the crowded short packet state or the uncrowded short packet state based on a previous determination if the number of packets communicated on the wireless medium over the first period of time having packet length below the packet length threshold is less than the first threshold number of packets and greater than the second threshold number of packets.

12. The method of any of examples 9-11, further comprising: detecting packet length of packets communicated on the wireless medium by decoding PHY preamble packet length information of those packets.

13. The method of any of examples 9-12, wherein the number of packets communicated on the wireless medium over the first period of time used to determine whether the wireless medium is in the crowded short packet state or the uncrowded short packet state excludes non-content-bearing packets 14. The method of any of examples 9-13, wherein the first operational mode comprises enabling enhanced distributed channel access (EDCA) for both uplink and downlink Wi-Fi communications, wherein the second operational mode comprises enabling EDCA for downlink Wi-Fi communications and disabling EDCA for uplink Wi-Fi communications.

15. The method of any of examples 9-14, further comprising: transmitting an indication of the selected operational mode to one or more other wireless devices communicating on the wireless medium.

16. The method of any of examples 9-15, further comprising: detecting packet length of packets communicated on a wireless medium over a second period of time; determining if a short packet state change has occurred on the wireless medium based at least in part on a number of packets communicated on the wireless medium over the second period of time having packet length below a packet length threshold; selecting a different operational mode if the short packet state has changed; and performing Wi-Fi communication on the wireless medium according to the selected operational mode.

17. A method for implementation by a wireless device, comprising: determining that a high density of short packet traffic is present in a Wi-Fi network; enabling one or more operational features configured to reduce collisions between voice traffic and non-voice traffic in the Wi-Fi network based on said determining; and performing wireless communication as part of the Wi-Fi network using the one or more enabled operational features.

18. The method of example 17, wherein the one or more operational features comprise use of request-to-send (RTS) and clear-to-send (CTS) indications for non-voice traffic, wherein RTS and CTS indications are not used for voice traffic.

19. The method of any of examples 17-18, wherein the one or more operational features comprise reservation of a configured number of slots after each Distributed Coordination Function (DCF) Interframe Space (DIFS) for voice traffic.

20. The method of any of examples 17-19, the method further comprising, at a later time: determining that a high density of short packet traffic is no longer present in the Wi-Fi network; disabling the one or more operational features based on said determining; and performing wireless communication as part of the Wi-Fi network with the one or more operational features disabled.

21. The method of any of examples 17-20, wherein the wireless device is an access point device (AP), wherein enabling the one or more operational features comprises transmitting an indication to one or more mobile stations (STAs) in the Wi-Fi network to enable the one or more operational features.

22. The method of any of examples 17-20, further comprising: receiving an indication that a high density of short packet traffic is present in the Wi-Fi network from an access point device providing the Wi-Fi network, wherein determining that a high density of short packet traffic is present in the Wi-Fi network is based on the indication received from the access point device.

23. A method for implementation by a wireless device, comprising: determining whether or not a high density of short packet traffic is present in a Wi-Fi network; enabling one or more operational features configured to reduce collisions between voice traffic and non-voice traffic in the Wi-Fi network based on said determining; and performing wireless communication as part of the Wi-Fi network using the one or more enabled operational features, wherein according to the one or more enabled operational features a different medium access algorithm is used depending on whether a packet to be transmitted is a voice packet or a non-voice packet.

24. The method of example 23, wherein the one or more operational features comprise use of request-to-send (RTS) and clear-to-send (CTS) indications for non-voice traffic, wherein to perform wireless communication as part of the Wi-Fi network using the one or more enabled operational features, the method further comprising: transmitting an RTS indication prior to transmitting a non-voice packet; transmitting a voice packet without transmitting an RTS indication.

25. The method of any of examples 23-24, wherein the one or more operational features comprise reservation of a configured number of slots after each Distributed Coordination Function (DCF) Interframe Space (DIFS) for voice traffic, wherein to perform wireless communication as part of the Wi-Fi network using the one or more enabled operational features, the method further comprising adding the configured number to a backoff counter after a DIFS for a non-voice packet if the backoff counter value is less than the configured number.

26. The method of any of examples 23-25, wherein the one or more operational features comprise disabling EDCA for voice packets, wherein to perform wireless communication as part of the Wi-Fi network using the one or more enabled operational features, the method further comprising: using legacy DCA as a medium access algorithm for a voice packet.

27. The method of any of examples 23-26, further comprising: broadcasting an indication to enable the one or more operational features in a Wi-Fi beacon transmission.

28. The method of any of examples 23-26, further comprising: receiving an indication to enable the one or more operational features in a Wi-Fi beacon transmission from an access point device providing the Wi-Fi network.

29. A wireless user equipment (UE) device, comprising: one or more radios, coupled to one or more antennas configured for wireless communication; and an processing element operably coupled to the one or more radios; wherein the UE is configured to implement any or all parts of any of the methods of examples 1-28 above.

15. A non-transitory computer accessible memory medium comprising program instructions which, when executed at a device, cause the device to implement any or all parts of any of the methods of examples 1-28 above.

16. A computer program comprising instructions for performing any or all parts of any of the methods of examples 1-28 above.

17. An apparatus comprising means for performing any or all of the method elements of any of examples 1-28 above.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a STA) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:
1. A wireless device, comprising:
a radio; and
a processing element;
wherein the radio and the processing element are configured to:
perform Wi-Fi communication over a Wi-Fi network according to a first operational mode during a first period of time;
monitor the Wi-Fi network, wherein said monitoring comprises detecting Wi-Fi packets communicated on the Wi-Fi network;
determine packet length for each detected Wi-Fi packet;
determine if a number of detected Wi-Fi packets having a packet length less than a first packet length threshold during the first period of time is greater than a first threshold number;

perform Wi-Fi communication over the Wi-Fi network according to a second operational mode during a second period of time if the number of detected Wi-Fi packets having a packet length less than the first packet length threshold during the first period of time is greater than the first threshold number, wherein the second period of time is subsequent to the first period of time; and continue to perform Wi-Fi communication over the Wi-Fi network according to the first operational mode during the second period of time if the number of detected Wi-Fi packets having a packet length less than the first packet length threshold during the first period of time is less than the first threshold number.

2. The wireless device of claim 1, wherein the radio and the processing element are further configured to, if the number of detected Wi-Fi packets having a packet length less than the first packet length threshold during the first period of time is greater than the first threshold number:

determine if a number of detected Wi-Fi packets having a packet length less than the first packet length threshold during the second period of time is less than a second threshold number;

perform Wi-Fi communication over the Wi-Fi network according to the first operational mode during a third period of time if the number of detected Wi-Fi packets having a packet length less than the first packet length threshold during the second period of time is less than the second threshold number, wherein the third period of time is subsequent to the second period of time; and continue to perform Wi-Fi communication over the Wi-Fi network according to the second operational mode during the third period of time if the number of detected Wi-Fi packets having a packet length less than the first packet length threshold during the second period of time is greater than the second threshold number.

3. The wireless device of claim 2,
wherein the second threshold number is lower than the first threshold number.

4. The wireless device of claim 1, wherein to determine if the number of detected Wi-Fi packets having a packet length less than the first packet length threshold during the first period of time is greater than the first threshold number, the radio and the processing element are further configured to exclude acknowledgement, request-to-send, and clear-to-send packets.

5. The wireless device of claim 1,
wherein the first operational mode comprises enabling enhanced distributed channel access (EDCA) for both uplink and downlink voice over internet protocol (VoIP) communications,
wherein the second operational mode comprises enabling EDCA for downlink VoIP communications and disabling EDCA for uplink VoIP communications.

6. The wireless device of claim 1, wherein the radio and the processing element are further configured to:
provide an indication of whether or not the WiFi network is experiencing crowded short packet conditions based on said comparing.

7. A method comprising:
by a wireless device:
monitoring the wireless medium over the first period of time to determine a number of packets having a length below a length threshold communicated on the wireless medium over the first period of time;
determining whether or not a wireless medium is experiencing crowded short packet conditions during a first period of time, wherein determining whether or not the wireless medium is experiencing crowded short packet conditions during the first period of time is based at least in part on the determined number of packets having a length below the length threshold communicated on the wireless medium over the first period of time;
selecting an operational mode from at least a first operational mode and a second operational mode based at least in part on determining whether or not the wireless medium is experiencing crowded short packet conditions during the first period of time; and
performing wireless communication on the wireless medium according to the selected operational mode.

8. The method of claim 7, the method further comprising:
receiving an indication of whether or not the wireless medium is experiencing crowded short packet conditions during the first period of time from an access point,
wherein determining whether or not the wireless medium is experiencing crowded short packet conditions during the first period of time is based on the indication.

9. The method of claim 7,
wherein determining whether or not the wireless medium is experiencing crowded short packet conditions during the first period of time is also based at least in part on a previous determination of whether or not the wireless medium is experiencing crowded short packet conditions.

10. The method of claim 7,
wherein the wireless medium is used for Wi-Fi communication,
wherein acknowledgement, request-to-send, and clear-to-send packets are excluded when determining the number of packets having a length below the length threshold communicated on the wireless medium over the first period of time.

11. The method of claim 7,
wherein performing wireless communication on the wireless medium comprises performing Wi-Fi communication on the wireless medium,
wherein the first operational mode comprises enabling enhanced distributed channel access (EDCA) for both uplink and downlink Wi-Fi communications,
wherein the second operational mode comprises enabling EDCA for downlink Wi-Fi communications and disabling EDCA for uplink Wi-Fi communications.

12. The method of claim 7, wherein the wireless device is an access point device providing a Wi-Fi network on the wireless medium, the method further comprising:
providing an indication to wireless devices in the Wi-Fi network of whether or not the wireless medium is experiencing crowded short packet conditions during the first period of time.

13. An apparatus, comprising:
one or more processing elements, wherein the one or more processing elements are configured to:
perform Wi-Fi communication over a Wi-Fi network according to a first operational mode during a first period of time;
monitor the Wi-Fi network, wherein said monitoring comprises detecting Wi-Fi packets communicated on the Wi-Fi network;
determine packet length for each detected Wi-Fi packet;

determine a number of detected Wi-Fi packets having a packet length less than a first packet length threshold during the first period of time;

compare the number of detected Wi-Fi packets having a packet length less than the packet length threshold during the first period of time to a first threshold number; and select an operational mode for performing future W-Fi communication based on said comparing.

14. The apparatus of claim 13, wherein when the number of detected Wi-Fi packets having a packet length less than the first packet length threshold during the first period of time is greater than the first threshold number, the one or more processing elements are configured to:

perform Wi-Fi communication over the Wi-Fi network according to a second operational mode during a second period of time, wherein the second period of time is subsequent to the first period of time.

15. The apparatus of claim 14, wherein when the number of detected Wi-Fi packets having a packet length less than the first packet length threshold during the first period of time is greater than the first threshold number, the one or more processing elements are configured to:

determine if a number of detected Wi-Fi packets having a packet length less than the first packet length threshold during the second period of time is less than a second threshold number;

perform Wi-Fi communication over the Wi-Fi network according to the first operational mode during a third period of time if the number of detected Wi-Fi packets having a packet length less than the first packet length threshold during the second period of time is less than the second threshold number, wherein the third period of time is subsequent to the second period of time; and continue to perform Wi-Fi communication over the Wi-Fi network according to the second operational mode during the third period of time if the number of detected Wi-Fi packets having a packet length less than the first packet length threshold during the second period of time is greater than the second threshold number.

16. The apparatus of claim 15, wherein the second threshold number is lower than the first threshold number.

17. The apparatus of claim 13, wherein when the number of detected Wi-Fi packets having a packet length less than a first packet length threshold during the first period of time is less than the first threshold number, the one or more processing elements are configured to continue to perform Wi-Fi communication over the Wi-Fi network according to the first operational mode.

18. The apparatus of claim 13, wherein to determine the number of detected Wi-Fi packets having a packet length less than the first packet length threshold during the first period of time, the one or more processing elements are further configured to exclude acknowledgement, request-to-send, and clear-to-send packets.

19. The apparatus of claim 13,
wherein the first operational mode comprises enabling enhanced distributed channel access (EDCA) for both uplink and downlink voice over internet protocol (VoIP) communications,
wherein said selecting the operational mode comprises selecting a second operational mode, wherein the second operational mode comprises enabling EDCA for downlink VoIP communications and disabling EDCA for uplink VoIP communications.

20. The apparatus of claim 13, wherein the one or more processing elements are further configured to:
provide an indication of whether or not the WiFi network is experiencing crowded short packet conditions based on said comparing.

\* \* \* \* \*